United States Patent
Stern

(10) Patent No.: US 7,819,088 B2
(45) Date of Patent: Oct. 26, 2010

(54) PORTABLE RETRACTABLE BATTERYLESS PET LEASH APPARATUS WITH ILLUMINATABLE LIGHT AND OPERABLE IN COMBINATION WITH STATIONARY HOLDER THEREFOR

(76) Inventor: Ari K. Stern, 8126 Township Dr., Owings Mills, MD (US) 21117

( * ) Notice: Subject to any disclaimer, the term of this patent is extended or adjusted under 35 U.S.C. 154(b) by 212 days.

(21) Appl. No.: 12/072,368

(22) Filed: Feb. 26, 2008

(65) Prior Publication Data

US 2008/0223308 A1  Sep. 18, 2008

Related U.S. Application Data

(60) Provisional application No. 60/903,437, filed on Feb. 26, 2007.

(51) Int. Cl.
*A01K 27/00* (2006.01)
(52) U.S. Cl. ............................................ 119/796
(58) Field of Classification Search ............ 119/795, 119/796, 797, 798, 769, 776, 778
See application file for complete search history.

(56) References Cited

U.S. PATENT DOCUMENTS

| | | | | |
|---|---|---|---|---|
| 2,023,950 A * | 12/1935 | Carter | 119/792 |
| 2,247,901 A * | 7/1941 | Alexander | 362/192 |
| 2,277,897 A * | 3/1942 | Alexander | 362/192 |
| 2,314,504 A * | 3/1943 | Lifchultz | 242/379.2 |
| 2,437,786 A * | 3/1948 | Oberdorf et al. | 242/382.4 |
| 2,535,041 A * | 12/1950 | Clark | 310/75 B |
| 2,776,644 A * | 1/1957 | Fontaine | 119/796 |
| 2,919,676 A * | 1/1960 | Schneider | 119/796 |
| 3,123,052 A * | 3/1964 | Marshall | 119/789 |
| 3,315,642 A * | 4/1967 | Rogers et al. | 119/796 |
| 3,318,288 A * | 5/1967 | Mullritter | 119/796 |
| 3,693,596 A * | 9/1972 | Croce et al. | 119/796 |
| 4,374,336 A * | 2/1983 | Shimizu | 310/154.05 |
| 4,468,579 A * | 8/1984 | Suzuki | 310/208 |
| 4,762,089 A * | 8/1988 | McNulty | 119/796 |
| 4,796,566 A * | 1/1989 | Daniels | 119/789 |
| 4,887,551 A * | 12/1989 | Musetti | 119/796 |
| 5,022,351 A * | 6/1991 | Daniels | 119/789 |
| 5,377,626 A * | 1/1995 | Kilsby et al. | 119/796 |
| 5,483,926 A * | 1/1996 | Bogdahn | 119/796 |
| 5,558,044 A * | 9/1996 | Nasser et al. | 119/796 |
| 5,762,029 A * | 6/1998 | DuBois et al. | 119/796 |
| 5,887,550 A * | 3/1999 | Levine et al. | 119/796 |
| 6,327,998 B1 * | 12/2001 | Andre et al. | 119/712 |
| 6,845,736 B1 * | 1/2005 | Anderson | 119/796 |
| 6,955,138 B2 * | 10/2005 | DeBien | 119/776 |
| 7,493,873 B2 * | 2/2009 | Petersen | 119/789 |
| 2004/0154557 A1 * | 8/2004 | Meissner | 119/796 |
| 2004/0200435 A1 * | 10/2004 | Debien | 119/772 |

(Continued)

*Primary Examiner*—Rob Swiatek
*Assistant Examiner*—Ebony Evans
(74) *Attorney, Agent, or Firm*—The Weintraub Group, P.L.C.

(57) ABSTRACT

A specially configured pet leash housing and stationary holder therefor, wherein the pet leash extends/retracts (i.e., plays out) from the leash housing, when hand carried, or from the stationary holder, when operably mounted therein. The leash housing includes a batteryless energy source for powering a light in the pet leash upon movement of the pet leash relative to the housing. The stationary holder is adapted to be impaled into the ground and has clam-shell mating halves which form an accessible chamber for mounting the leash housing therewithin.

18 Claims, 4 Drawing Sheets

U.S. PATENT DOCUMENTS

2004/0237906 A1* 12/2004 Waxman et al. ............. 119/796
2005/0172914 A1* 8/2005 Woodruff .................... 119/796
2008/0271683 A1* 11/2008 Mitchell ..................... 119/796

* cited by examiner

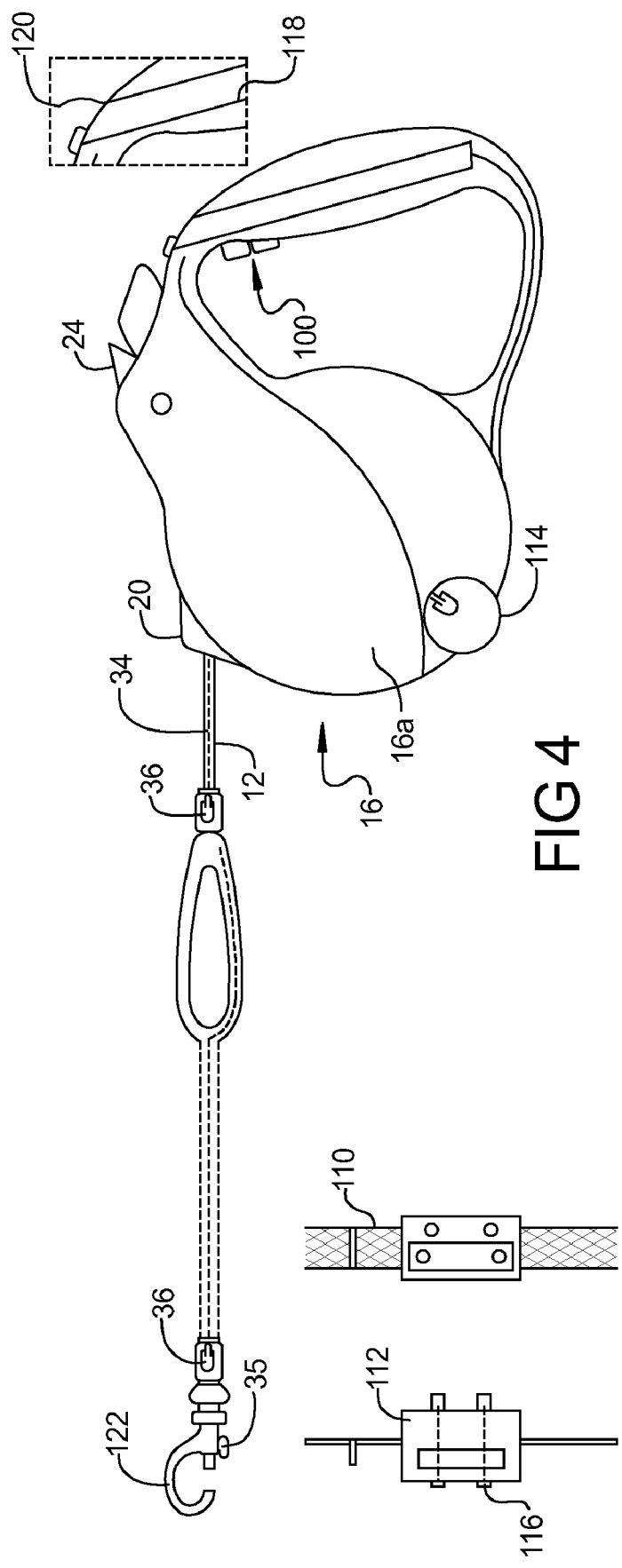

US 7,819,088 B2

PORTABLE RETRACTABLE BATTERYLESS PET LEASH APPARATUS WITH ILLUMINATABLE LIGHT AND OPERABLE IN COMBINATION WITH STATIONARY HOLDER THEREFOR

CROSS-REFERENCE TO RELATED APPLICATION

This application claims the benefit of U.S. Provisional Application No. 60/903,437, filed Feb. 26, 2007, the entire disclosure of which is incorporated herein in its entirety.

BACKGROUND OF THE INVENTION

1. Field of the Invention

This invention relates to pet leash apparatus and stationary holders therefor, and more particularly, to a specially configured pet leash housing and stationary holder therefor, wherein the pet leash extends/retracts from the housing, when hand carried, or from the holder, when operably mounted therein. More particularly, the leash housing includes a batteryless energy source for powering a light in the pet leash upon movement of the pet leash relative to the housing.

2. Description of Related Art

Numerous structures for the containment of animals and other pets are known. In some situations, a pet owner or user may wish to tether the pet to a stationary holder, such as to a pole in the yard. In other situations, the user may wish to take the pet for a walk, but for a variety of reasons, cannot let the pet run free. Depending on the control and containment needed, the leash should be extendible and retractable, thus allowing the pet a certain amount of running space. In the situation wherein the user is walking the pet at dusk or at night, for safety, certain illumination of one or more of the user, the apparatus, or the pet may be desirable.

Dog tether apparatus, such as a leash, or leash handle, or leash stand and the like is known, such as exemplified by U.S. Patent Publication US 2005/0087148 (Rabello), published Apr. 28, 2005; U.S. Pat. No. 6,612,263 (Schied et al.), issued Sep. 2, 2003; U.S. Pat. No. 6,820,573 (McMullin), issued Nov. 23, 2004; U.S. Pat. No. 6,318,302 (Bedient), issued Nov. 20, 2001.

Retractable pet leashes are known, as exemplified by U.S. Pat. Nos. 6,886,499 (Mesisner), issued May 3, 2005; 925,967; 6,694,922 (Walter et. al.), issued Feb. 24, 2004; and 4,501,230 (Talo), issued Feb. 26, 1985.

Further, combined retractable leash and illumination apparatus, in the form of a flashlight, is disclosed in U.S. Pat. No. 6,024,054 (Matt et al.) issued Feb. 15, 2000.

Additionally, illuminated retractable pet leashes are disclosed in U.S. Pat. Nos. 6,925,967 (Woodruff), issued Aug. 9, 2005; 6,877,889 (Peng et al.), issued Apr. 12, 2005; and 5,967,095 (Greves), issued Oct. 19, 1999.

Each of the above documents is believed to solve some problems of a pet owner. There is an ongoing need for improvements.

SUMMARY OF THE INVENTION

Briefly, there is provided in accordance with one aspect of the present invention a retractable pet leash, comprising a leash housing having an interior chamber and an outlet communicating with said chamber, a spool supported in said housing for rotation in first and second directions relative to an axis of rotation, an elongated extendible pet leash, said leash having rearward and forward end portions, the rearward end portion wrapped around said spool and the forward end portion movably disposed in said outlet and connectable to a pet collar, a first wire of electrically conductive material extending between the ends of the leash and having first and second ends, and an illuminatable light proximate to the free end of said leash and in electrical circuit relation with the first end of said wire, a spring biased retractor mechanism for normally biasing the spool to rotate in one direction only, wherein to retract and wrap the leash about the spool, means for releasably locking and permitting the spool to rotate relative to the housing, means for generating an electrical current upon rotation of the spool relative to the housing, said means for generating an electrical current including a second wire of electrically conductive material having opposite ends and coiled into the shape of a torus, and at least one magnet having a magnetic field slidably disposed inside said torus, the torus fixedly secured to the spool for rotation therewith and in concentric relation with the axis of rotation of said spool wherein rotation of the spool causes said magnet to slide relative to the coil and an electrical current to be induced, and electrical circuitry for connecting the opposite ends of the torus and the second end of the leash wire in electrical circuit relation with one another.

According to this invention, a generally planar flange is fixedly attached to the spool and radiates outwardly from an outer cylindrical surface of the spool, and the torus is fixedly mounted to the outer periphery of the flange in generally coaxial relation to the center axis of the spool.

The leash housing generally comprises a pair of complementary matable sidewalls that are joined to form the interior chamber, and the spool is mounted for rotation in the housing, such as by the flange being dimensioned for nested freewheeling rotation within and relative to a compartment formed by sidewall structure, or by the spool being hollow and mounted for rotation on a complementary bearing shaft extending between the sidewalls.

Preferably, the torus shaped coil forms a doughnut-shaped surface generated by a circle rotated about an axis in its plane that does not intersect the circle, and a plurality of magnets are disposed within the torus. The magnets may be short and generally cylindrically shaped with their outer surfaces dimensioned to enable sliding movement relative to the inner surface of the torus, or spherical balls. The coil may be laminated wherein the wire of the coil forms a smooth sliding or rolling surface.

Many magnets are contemplated, such as the rare-earth Neodymium magnet, a combination of neodymium, boron and iron—$Nd_2Fe_{14}B$. However, magnets that are very strong in comparison to their mass are contemplated.

Desirably, the illuminatable light is a conventional light emitting diode ("LED"), and the electrical circuitry supplies power to the LED and includes a printed circuit board ("PCB") fixedly attached to one of the spool and flange. Preferably, the PCB includes electrical components, such as a DC to AC power inverter, and a capacitor for storing voltage resulting from the induced current.

In another embodiment, the spool is hollow and the torus coil is mounted to the outer periphery of a flange fixedly connected to the spool, the ends of the coil are extended into the hollow, the PCB is mounted to a sidewall and in electrical circuit relation with an LED on the exterior of the leash housing, and electrical circuitry in the form of very long tangle free wires connect the torus wires to the PCB to illuminate the exterior LED.

Preferably, the retractable leash housing is formed in a manner to include a handle or handgrip and the means for releasably locking and permitting the spool to rotate relative to the housing includes a release pad operably connected to the spool. The handgrip forms a closed loop configured to receive and be held by the hand of a user and position the thumb thereof proximate to the release pad. The release pad is positioned to extend through the closed loop and operate on locking structure to release the spool from locked relation in a selected position. Locking the spool retains the forward end portion of the leash disposed in the outlet.

The spring biased retractor mechanism for normally biasing the spool to rotate in one direction only wherein to retract and wrap the leash about the spool includes a coiled torsion spring, the opposite ends of which are operably engaged with the spool and the leash housing.

In accordance with another aspect of the present invention there is provided a retractable pet leash system, comprising, in combination:

a leash apparatus, said leash apparatus including a leash housing having an interior chamber and an outlet, and a pet leash in said chamber, said leash having a free end to be dispensed and retracted from the outlet of said leash housing, and a stationary holder for holding said leash apparatus, said holder comprising:

an openable support housing disposed along a central axis and having first and second housing sections, and means for removably connecting the sections together, the connected sections cooperating to form an accessible interior chamber, a bottom portion, a top opening communicating with the interior chamber, and a compartment for receiving and orienting the leash housing, a ground engaging anchor plate, said anchor plate including an anchor for impaling into the ground, and means for connecting the anchor plate to the bottom portion of said support housing and orienting the central axis of the support housing and anchor relative to the ground, and wherein the free end of the pet leash is deployable from the outlet of said leash housing and through the top opening of said support housing when the support housing is secured to the ground.

Preferably, the support housing is frusto-conical, the housing sections narrowing from the bottom portion to the top opening, and the top opening includes reinforcement eyelet structure to resist damage to the support housing resulting from the leash being pulled outwardly from the leash housing. Preferably, the eyelet is horizontally disposed and the support housing is vertically disposed when the anchor is impaled into the ground.

Further, the leash housing defines a forward section, which stores and releases the pet leash, and a rearward section, which is in the form of a loop shaped handgrip, and the compartment in the support housing orients the outlet of the leash housing with the top opening of the support housing.

According to this invention, there is provided an improvement in a retractable leash apparatus of the type including a housing having a spring biased spool mounted for rotation about an axis, a leash wrapped about the spool such that the leash can extend and retract relative to the housing, respectively, depending on the direction of spool rotation, means for biasing the spool in the retracting direction, and means for releasably locking the leash following extension of the leash, the improvement comprising an electrical light, an electrically conductive wire extending through the leash, the wire including a first end connected to said light and a second end, electrical induction means for generating an electrical current, said induction means comprising a conductive wire having opposite ends and formed into a cylindrical donut-shaped coil, and a magnet slidingly disposed within the coil, sliding of the magnet relative to the coil inducing an electrical current in said wire, mounting means for fixedly mounting the coil in concentric relation about the spool and for rotation therewith, and electrical circuitry for connecting the second end of said wire and the opposite ends of the coil in electrical circuit relation to one another.

The present invention will be more clearly understood with reference to the accompanying Drawings and to the following Detailed Description, in which like reference numerals refer to like parts and wherein:

BRIEF DESCRIPTION OF THE DRAWINGS

FIG. 4 is a side elevation view, partly in phantom, of a further embodiment hereof;

FIG. 5 is a fragmentary view of a lock latch shown in FIG. 4;

FIG. 6 is a partial view of a dog collar incorporating some of the features of the present invention; and FIG. 7 is a further embodiment thereof.

DETAILED DESCRIPTION OF PREFERRED EMBODIMENTS

Figure 1:
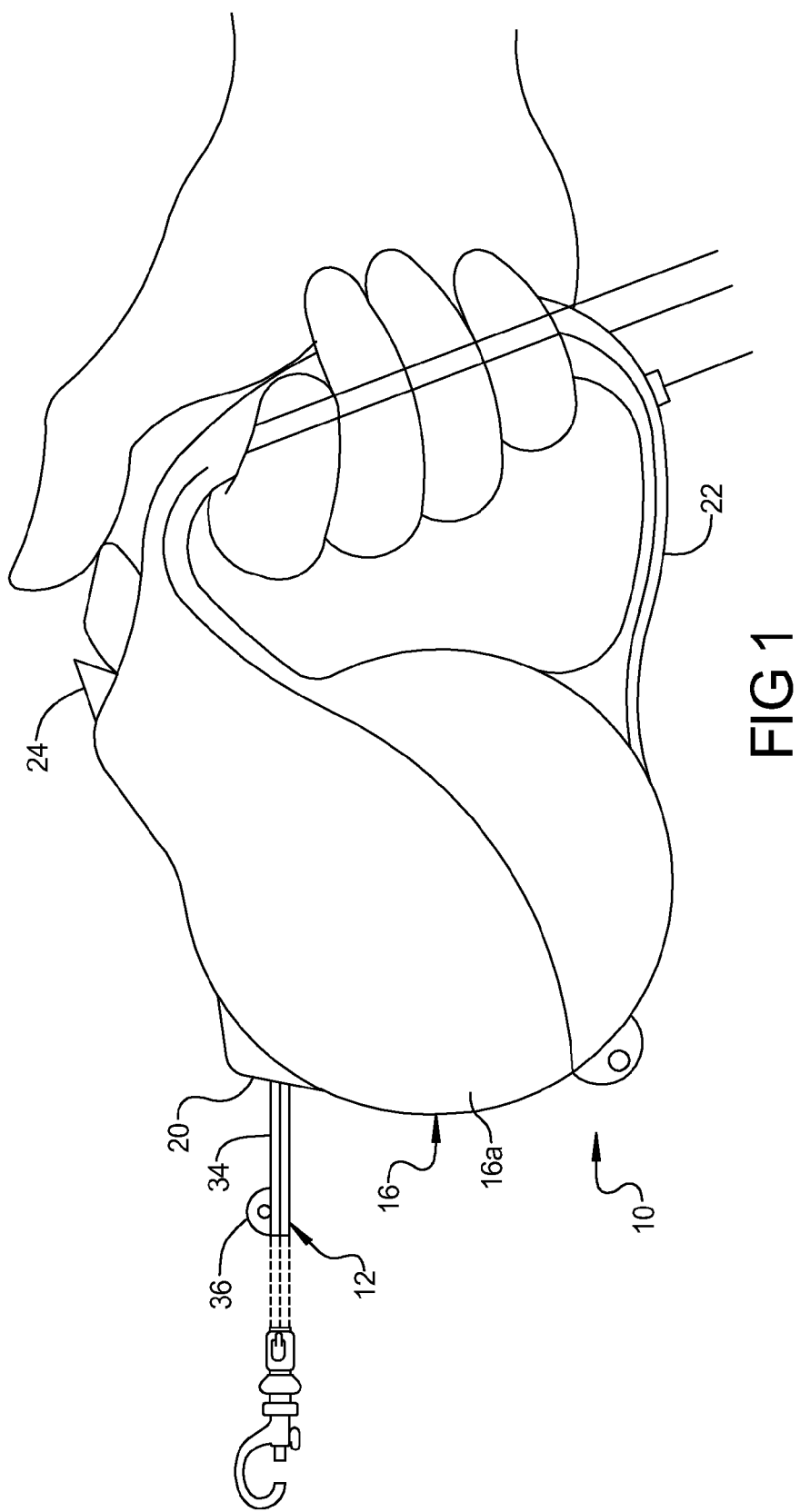
FIG. 1 illustrates a portable retractable pet leash apparatus that includes a handheld leash housing, and a pet leash that is stored within the housing and includes a light that is illuminated as a result of the leash being dispensed from the housing according to the present invention.
Figure 2:
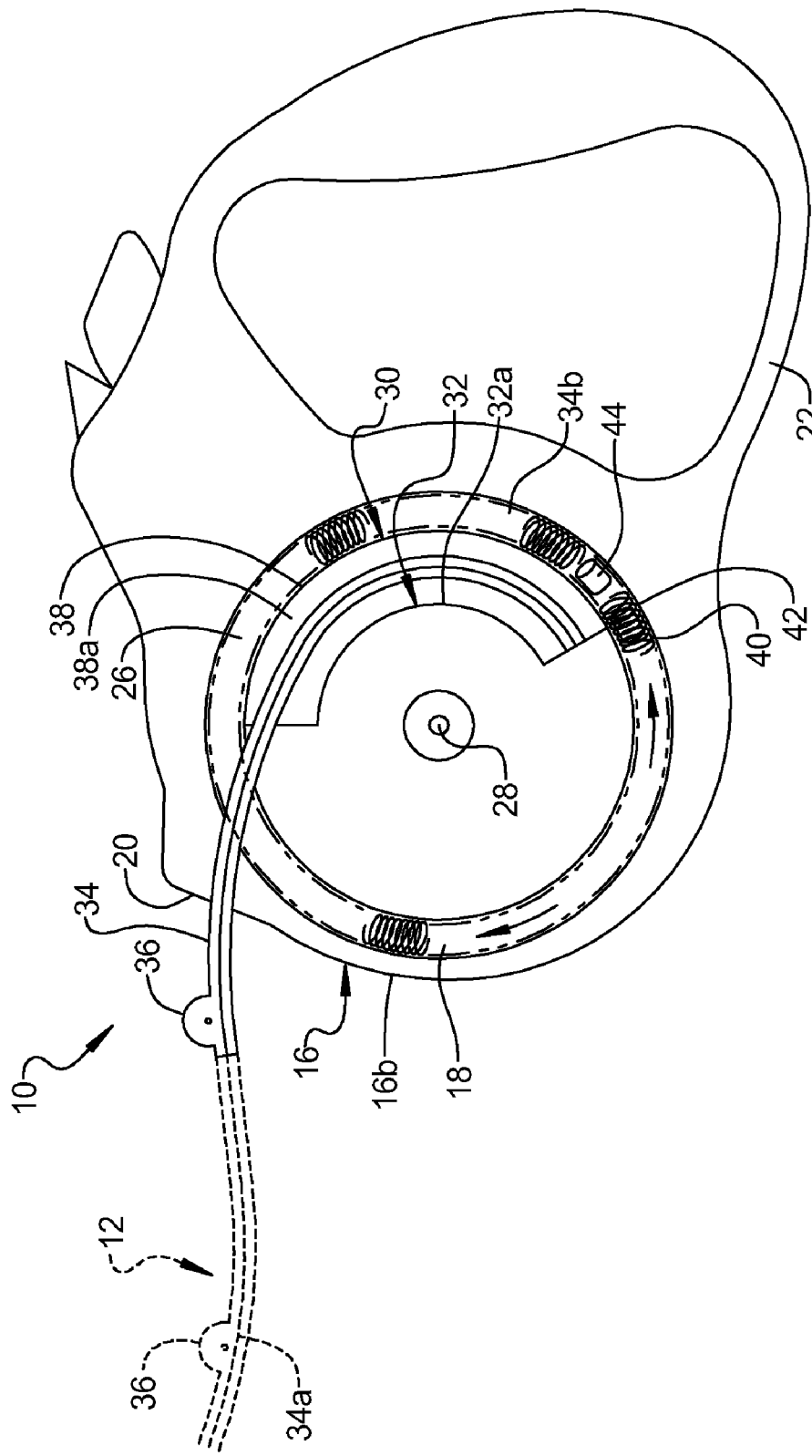
FIG. 2 shows the pet leash apparatus of FIG. 1 with a portion of one sidewall of the leash housing removed to show detail of an interior chamber thereof, a bearing shaft, a spool about which a pet leash is wrapped and supported for rotation about the bearing shaft, and electromagnetic induction structure.
Figure 3:
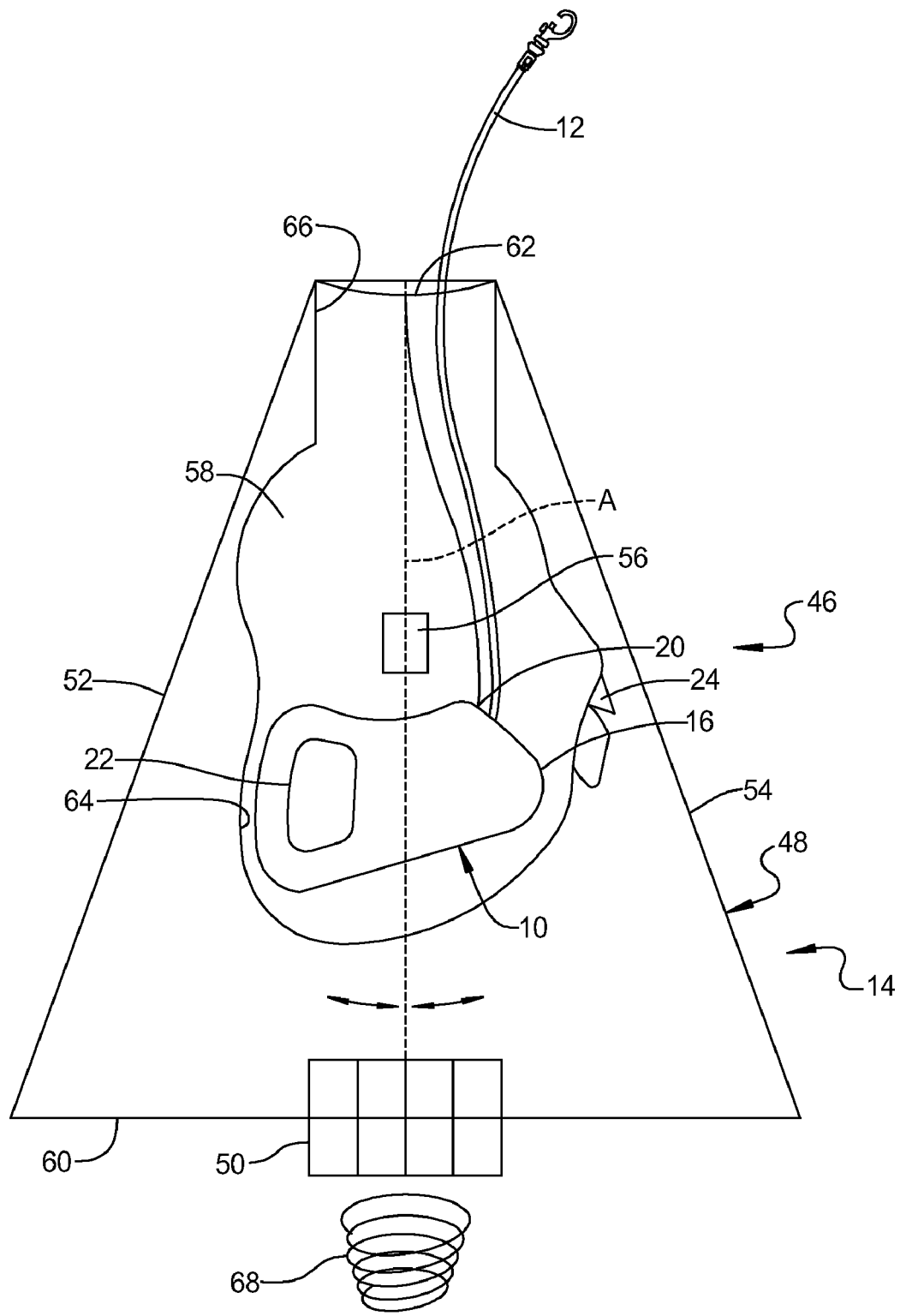
FIG. 3 is a side elevation view of a stationary leash system wherein a cone-shaped ground mounted enclosure receives and orients the leash housing in a manner to permit the pet leash to be extended outwardly of the leash housing and through the top of the enclosure.

Turning now to the drawings, FIGS. 1-2 disclose a portable retractable pet leash apparatus, generally indicated by the reference number 10, for carrying a pet leash 12, and FIG. 3 discloses a stationary holder or enclosure, generally indicated by the reference number 14, for holding and orienting the pet leash apparatus. As will be described in detail herein below, the leash apparatus 10 is adapted to be handheld and carried around by the user and/or be stationary and be stored interiorly of the enclosure 14. In either use, the free end of the pet leash 12 terminates in a hook or like element, which is fastened to a pet collar worn by the pet. When the pet moves away, the forward end portion of the leash 12 is pulled outwardly from the leash apparatus 10, and outwardly of the enclosure 14 when stored therein.

Referring to FIGS. 1 and 2, the pet leash apparatus 10 comprises a leash housing 16, which is formed by a pair of mating sidewalls 16a and 16b being joined together to form an interior chamber 18 for storing the leash 12 and elements for mounting and extending and/or retracting the leash, in a manner described herein below. Preferably, the housing sections 16a and 16b are comprised of an electrically nonconductive material, such as nylon and/or a suitable polymeric material. The use of such material contributes to lightness and the ability to form mating partitions which come together and form internal structure of the leash housing.

The leash housing 16 has forward and rearward end sections spaced longitudinally with the forward end section forming an outlet opening 20 that communicates with the chamber 18 and passes the forward end portion of the pet leash 12 inwardly and outwardly of the leash housing 16. The rearward end section, in the shape of a closed loop, forms a handle or handgrip 22 for gripping by the hand of a user. The handgrip 22 is adapted to position the thumb of the user's hand proximate to an actuator pad or button 24, the pad extending through the wall forming the handgrip 22 and into the interior chamber 18. The pad 24 actuates release linkage in the chamber 18 to enable the user to prevent and/or permit the pet leash to extend from the chamber 18 or be retracted back into the chamber, in a manner described herein below.

The forward end section is generally rounded and outwardly projecting. In this regard, one sidewall 16a, or both sidewalls 16a and 16b, includes a flatted semi-hemispherical dome that projects laterally outwardly from a mid-plane of the housing, resulting in a corresponding concave dome-shaped compartment 26 being provided in the interior chamber 18.

A cylindrical bearing shaft 28, in centered relation with the compartment 26, extends between the sidewalls 16a and 16b. The shaft is fixedly secured to one of the sidewalls 16a and 16b.

A leash assembly 30 is nested in the compartment 26. The leash assembly 30 includes a spring biased hollow cylindrical spool 32, supported on the shaft 28 for rotation in first and second directions, and the elongated extendible pet leash 14. The pet leash 14 has rearward and forward end portions, respectively, with the rearward end portion being wrapped around the outer surface 32a of the spool and the forward end portion being movably disposed in the outlet 20 and extending outwardly therefrom to terminate in a free end. The free end is adapted to be connected to a pet collar.

A first wire 34 of electrically conductive material extends between the opposite ends of the leash 14 and opposite respective first and second ends 34a and 34b. Generally, the wire 34 is embedded into the material of the leash.

An illuminatable light 36 is proximate to the free end of the pet leash 14 and in electrical circuit relation with the first end 34a of the wire 34. Preferably, the light is a light emitting diode ("LED").

A flat generally circular flange 38 is fixed to one endface of the spool for rotation therewith. The flange 38 has an outer periphery 38a and is nested within the dome-shaped compartment 26 of the sidewall 16a.

It should be noted that the shaft 28 provides a certain control over rotation. In some applications, the shaft 28 could be removed and the circular flange 38 allowed to be free-wheeling within the compartment 26. That is, the flatted wall of the semi-hemispherical dome seats the planar surface of flange 38 and a concave surface of the dome-like shape encircles the outer periphery, or circumference, of the flange 38, to allow relative rotation therebetween.

A spring biased retractor mechanism normally biases the spool 32 to rotate in one direction only, and in the direction wherein the leash 14 is urged to retract into the chamber 18 and be wrapped about the spool. A suitable retractor spring comprises a resilient plate like band coiled into a helix, such as a winding or circling round a center or pole and gradually receding from it; such as the spiral curve of a watch spring. The outer and inner radial ends of the band engage retention detents operating between the housing sidewall and the spool 32 and urge the spool to rotate about an axis extending through the center of the spool.

While not shown, such retractor spring is known in the art and illustrated in the aforementioned U.S. Pat. Nos. 4,501, 230; 6,925,967; and 6,694,922, the entire disclosures of each specifically incorporated herein by reference.

Releasable locking structure is provided for selectively releasably locking and permitting the spool 32 to rotate relative to the leash housing 16, such structure operating in conjunction with the release pad 24 and the spool 32. In general, such structure includes linkages that connect the pad 24 to the spool 32. While not shown such connection is understood by those skilled in the art, such as exemplified by the aforementioned U.S. Pat. Nos. 4,501,230; 6,925,967; and 6,694,922.

Significant and crucial to this invention is the provision of an arrangement for generating an electrical current upon rotation of the spool 32 relative to the leash housing 16, such arrangement enabling the leash apparatus 10 to be essentially batteryless. The arrangement for generating an electrical current includes a second wire 40 of electrically conductive material having opposite ends and coiled into the shape of a torus, generally indicated by the reference number 42, and at least one magnet 44, having a magnetic field, slidably disposed inside the torus. The torus is fixedly secured to the outer periphery of the flange 38 for rotation therewith when the spool 24 rotates, and in concentric relation with the axis of rotation of the spool. Rotation of the spool 32 causes the magnet 44 to slide relative to the coil and an electrical current to be induced.

Preferably, the torus shaped coil 42 forms a donut-shaped surface generated by a circle rotated about an axis in its plane that does not intersect the circle. Further, a plurality of magnets 44 is disposed within the torus. As shown, the magnets 44 are short and generally cylindrically shaped with their outer surfaces dimensioned to enable sliding movement relative to the inner surface of the torus. In some applications, the magnets may be in the form of spherical balls that roll within the torus. The wire 40 forming the coil may be laminated wherein the wire of the coil forms a smooth sliding or rolling surface for the magnet(s).

Many magnets are contemplated, such as the rare-earth Neodymium magnet, a combination of neodymium, boron and iron—$Nd_2Fe_{14}B$. However, magnets that are very strong in comparison to their mass are contemplated.

Electrical circuitry is provided for connecting the opposite ends of the wire 40 that forms the torus 42 and the second end 34b of the leash wire 34 in electrical circuit relation with one another. The electrical circuitry includes a printed circuit board ("PCB") fixedly attached to one of the spool 24 and flange 38. Preferably, the PCB includes electrical components, such as a DC to AC power inverter, and a capacitor for storing voltage resulting from the induced current.

The PCB and components thereof are conventional and understood by those skilled in the art, such as exemplified by the aforementioned U.S. Pat. Nos. 4,501,230; 6,925,967; and 6,694,922.

Desirably, the illuminatable light 36 is a conventional light emitting diode ("LED"), and the electrical circuitry supplies power to the LED and the PCB.

Desirably, the leash apparatus 10 according to the present invention enables the user to be seen on a dark night without having to wonder if batteries in an apparatus are dead. This means that there is no maintenance and the apparatus always recharges itself upon use. The apparatus is batteryless. The capacitor based circuit ensures that power is stored and if not available can be readily generated by pulling movement on the pet leash and concurrent rotation of the spool. LED will guarantee a bright white light whenever and wherever the apparatus is used.

Referring to FIG. 3, In accordance with another aspect of the present invention there is provided a retractable pet leash system, generally indicated by the reference number 46, comprising, in combination, the leash apparatus 10 and the stationary holder 14 for holding and orienting the leash apparatus 10. The holder 14 comprises an openable support housing or enclosure 48, and a ground engaging anchor plate 50.

The enclosure 48 is generally frusto-conical and disposed along a central axis "A", has first and second housing sections 52 and 54, a hinge 56 for connecting the sections together, and a latch for connecting the sections together wherein to form a specially configured accessible interior chamber 58 for nesting the leash apparatus 10. The housing sections 52 and 54 form a bottom portion 60, and narrow from the bottom portion to a top opening 62 communicating with the chamber 58. Further, when closed, the housing sections form a specially configured compartment 64 for receiving and orienting the leash housing.

The top opening 62 includes a reinforcement eyelet 66 to resist damage to the enclosure 48 resulting from the pet leash 12 being pulled outwardly from the leash housing 16.

The ground engaging anchor plate 50 is secured to the bottom portion 60 of the enclosure. The plate 50 includes an anchor 68 adapted to be impaled or screwed into the ground.

Preferably, the eyelet 66 is horizontally disposed and the enclosure housing 48 is vertically disposed when the anchor 68 is impaled into the ground. The compartment 64 in the enclosure 48 orients the outlet 20 of the leash housing 16 with the top opening 62 of the enclosure 48.

The free end of the pet leash is deployable from the outlet 20 of the leash housing 12 and through the top opening 62 of the enclosure 48 when the enclosure is secured to the ground.

In another embodiment, the spool is hollow and the torus coil is mounted to the outer periphery of a flange fixedly connected to the spool, the ends of the coil are extended into the hollow, the PCB is mounted to a sidewall and in electrical circuit relation with an LED on the exterior of the leash housing, and electrical circuitry in the form of very long tangle free wires connect the torus wires to the PCB to illuminate the exterior LED.

Now, with reference to FIG. 4 there is depicted therein a further embodiment hereof.

In accordance herewith the wire 34 extends to an area proximate the clasp or latch of the leash. The terminus of the leash extends into the closure element so that it can be in communication with a wired collar system of the type used to restrain dogs within a confine.

As is known to those skilled in the art to which the present invention pertains there does exist presently electrical collars which are used to restrain animals and train them and keep them within certain confines. By extending the wire 34 into the latch and using it to power a signaling means 35, an electrical shock can be transmitted to the animal to keep it restrained. To this end, a switch 100 is disposed within the handle to actuate the shocking or an audio effect. The switch 100 can comprise a standard spring operated button switch or the like.

Furthermore, a second light emitting diode 36 can be disposed proximate the closure or clasp member.

Furthermore, the present invention contemplates the inclusion of an audio system for communicating with the dog. To this end, a portable receiver or the like may be built into a dog collar 110 of the type disposed about the neck of the animal. The portable receiver may be battery operated and have incorporated therein light means such as a light emitting diode 116 to indicate not only the presence of the animal but to indicate that the power is operable. The audio system includes a speaker 112 for receiving audio sounds and, also, may include the shock connection studs. The battery-operated system may be enclosed within a waterproof seal which is removably mounted about the collar of the animal in the well-known manner.

The connection to the leash for establishing the audio system is, preferably, disposed in the clasp at 122. In this regard the contacts for the connection to the collar may be embedded within the closure element, as shown.

Other features of the present invention as contemplated herein include a dome reflector 114 disposed on the handle as well as an LED incorporated therein to illuminate the handle itself.

Additionally, the handle may have a closed hollowed-out area 118 for inserting a key or the like. The handle may include a hinged portion 120 which is hingedly connected to the main body of the handle and is maintained in a closed position to a suitable latch with the type well-known and commercially available such as a spring in detent or the like.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What I claim is:

1. A retractable pet leash, comprising a leash housing having an interior chamber and an outlet communicating with said chamber, a spool supported in said housing for rotation in first and second directions relative to an axis of rotation, said spool including a cylindrical outer surface and a planar flange radiating outwardly from the outer surface, said flange being generally perpendicular to the axis of rotation, an elongated pet leash, at least in part, wrapped about said spool, said leash having rearward and forward end portions, a first wire of electrically conductive material extending between said end portions, and an illuminatable light proximate to the forward end portion of said leash and in electrical circuit relation with said wire, wherein said rearward end portion is secured to said spool and the forward end portion is disposed in said outlet, the forward end portion defining a free end of the leash that is connectable to a pet collar and adapted to move relative to the outlet in a first direction wherein the leash is retracted in the housing and wrapped about the spool and in a second direction wherein the leash is extended outwardly and away from the housing and unwound from the spool, a spring biased retractor mechanism for normally biasing the spool to rotate in said first direction only wherein to retract and wrap the leash thereabout, means for releasably locking and permitting the spool to rotate relative to the housing, means for generating an electrical current upon rotation of the spool relative to the housing, said means for generating an electrical current including a second wire of electrically conductive material having opposite ends and coiled into the shape of a torus, and at least one magnet having a magnetic field and slidably disposed inside said torus, said torus being fixedly secured to the spool for rotation therewith and in concentric relation with the axis of rotation of said spool wherein rotation of the spool causes said magnet to slide relative to the coil and an electrical current to be induced, and electrical circuitry for connecting the opposite ends of the torus and the second end of the leash wire in electrical circuit relation with one another, wherein said torus is fixedly mounted to the flange in encircling relation about the outer surface and in coaxial relation to said axis of rotation.

2. The retractable pet leash according to claim 1, wherein:

said leash housing comprises a pair of complementary matable sidewalls that are joined to form the interior chamber and a compartment formed by sidewall structure, and said spool is mounted for rotation in the housing, such as by the flange being dimensioned for nested freewheeling rotation within and relative to said compartment formed by sidewall structure.

3. The retractable pet leash according to claim 1, wherein:

said leash housing comprises a pair of complementary matable sidewalls that are joined to form the interior chamber and a compartment formed by sidewall structure, and said spool is hollow and mounted for rotation on a complementary bearing shaft extending transversely between the sidewalls.

4. The retractable pet leash according to claim 1, wherein:

the torus shaped coil is doughnut-shaped and generated by a circle rotated about an axis in its plane that does not intersect the circle, and a plurality of separate magnets are slidably disposed within the torus.

5. The retractable pet leash according to claim 1, wherein said magnet is cylindrically shaped with the outer surface longitudinally short and dimensioned to enable sliding movement relative to the inner surface of the torus.

6. The retractable pet leash according to claim 1, wherein the magnet is a spherical ball that is dimensioned to enable sliding and rolling movement relative to the inner surface of the torus.

7. The retractable pet leash according to claim 1, wherein the second wire is laminated and forms a smooth interior sliding or rolling surface.

8. The retractable pet leash according to claim 1, wherein the illuminatable light is a light emitting diode ("LED"), and the electrical circuitry supplies power to the LED and includes a printed circuit board ("PCB") fixedly attached to one of the spool and flange.

9. The retractable pet leash according to claim 8, wherein the PCB includes a DC to AC power inverter, and a capacitor for storing voltage resulting from the induced current.

10. The retractable pet leash according to claim 1, wherein said leash housing includes a handgrip, said means for releasably locking includes a release pad operably connected to the spool, and said handgrip forms a closed loop configured to receive and be held by the hand of a user and position the thumb thereof proximate to the release pad.

11. The retractable pet leash according to claim 10, wherein the release pad is positioned to extend through the closed loop and operate on locking structure to release the spool from locked relation in a selected position, wherein locking the spool retains the forward end portion of the leash in the outlet.

12. The retractable pet leash according to claim 1, wherein the spring biased retractor mechanism includes a coiled torsion spring, the torsion spring having opposite first and second ends, respectively, operably engaged with the spool and the leash housing.

13. The retractable pet leash of claim 1 wherein said pet collar includes an electrically responsive securement clasp for releasably securing the collar about a pet, an electrical connector for completing an electrical circuit path between said electrical circuitry and said electrically responsive securement clasp, and means for transmitting a signal to the electrical connector to selectively complete an electrical path between the electrically responsive securement clasp and the first wire so as to electrically shock the pet.

14. The retractable pet leash of claim 13 wherein said pet collar includes an audio receiver, said leash housing includes a gripping handle, said gripping handle including a hollowed out access area adapted to receive a key and the like, said electrical circuitry includes a power inverter and a capacitor for storing voltage resulting from the induced current, and said means for transmitting a signal includes a manually actuatable switch disposed in said handle and operable to effect an electrical circuit path relation between the first wire and said electrical circuitry and transmit an electrical shock to the pet.

15. A retractable pet leash system, comprising, in combination:

the retractable pet leash of claim 1; and a stationary holder for holding said retractable pet leash, said holder comprising:

an openable support housing disposed along a central axis and having first and second housing sections, and means for removably connecting the sections together, the connected sections cooperating to form an accessible interior chamber, a bottom portion, a top opening communicating with the accessible interior chamber, and a compartment for receiving and orienting the leash housing, a ground engaging anchor plate, said anchor plate including an anchor for impaling into the ground, and means for connecting the anchor plate to the bottom portion of said support housing and orienting the central axis of the support housing and anchor relative to the ground, and the free end of the pet leash is deployable from the outlet of said leash housing and through the top opening of said support housing when the support housing is secured to the ground.

16. The retractable pet leash system according to claim 15, wherein the support housing is frusto-conical, the housing sections narrowing from the bottom portion to the top opening, and the top opening includes reinforcement eyelet structure to resist damage to the support housing resulting from the leash being pulled outwardly from the leash housing.

17. The retractable pet leash system according to claim 16, wherein the eyelet is horizontally disposed and the support housing is vertically disposed when the anchor is impaled into the ground.

18. The retractable pet leash system according to claim 17, wherein the leash housing defines a forward section, which stores and releases the pet leash, and a rearward section, which is in the form of a loop shaped handgrip, and the compartment in the support housing orients the outlet of the leash housing with the top opening of the support housing.

* * * * *